(12) United States Patent
Zhao et al.

(10) Patent No.: US 11,504,780 B2
(45) Date of Patent: Nov. 22, 2022

(54) CUTTING TOOL

(71) Applicant: SUMITOMO ELECTRIC HARDMETAL CORP., Itami (JP)

(72) Inventors: Tangwei Zhao, Itami (JP); Tomoyuki Fukuyama, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 16 days.

(21) Appl. No.: 16/651,189

(22) PCT Filed: Sep. 4, 2019

(86) PCT No.: PCT/JP2019/034851
§ 371 (c)(1),
(2) Date: Mar. 26, 2020

(87) PCT Pub. No.: WO2020/054558
PCT Pub. Date: Mar. 19, 2020

(65) Prior Publication Data
US 2020/0269325 A1 Aug. 27, 2020

(30) Foreign Application Priority Data
Sep. 12, 2018 (JP) .............................. JP2018-170323

(51) Int. Cl.
*B23C 5/00* (2006.01)
(52) U.S. Cl.
CPC ........ *B23C 5/006* (2013.01); *B23C 2200/367* (2013.01); *B23C 2210/168* (2013.01); *B23C 2210/287* (2013.01); *B23C 2210/40* (2013.01)
(58) Field of Classification Search
CPC .......... B23C 2210/281; B23C 2210/28; B23C 2210/40; B23C 2210/402;
(Continued)

(56) References Cited

U.S. PATENT DOCUMENTS 4,573,831 A * 3/1986 Lacey ................... B23C 5/2213
407/114
4,648,755 A * 3/1987 Stashko .................. B23C 5/109
407/36
(Continued)

FOREIGN PATENT DOCUMENTS

DE 1627088 A1 * 4/1970
DE 4137230 A1 * 5/1993 ............. B23C 5/109
(Continued)

OTHER PUBLICATIONS

English translation for Written Opinion of the International Searching Authority dated Oct. 21, 2019 for PCT/JP2019/034851.

*Primary Examiner* — Ryan Rufo
(74) *Attorney, Agent, or Firm* — Faegre Drinker Biddle & Reath LLP

(57) ABSTRACT

The first cutting insert is attached to a first pocket. The second cutting insert is attached to a second pocket. The third cutting insert is attached to a third pocket. The first pocket has a first seat surface, a second seat surface, a third seat surface, and a first swarf discharging groove. The second pocket has a fourth seat surface, a fifth seat surface, a sixth seat surface, and a second swarf discharging groove. The third pocket has a seventh seat surface, an eighth seat surface, a ninth seat surface, and a third swarf discharging groove. In a cross section perpendicular to an axis, an angle formed between a straight line along the sixth seat surface and a tangent of the second swarf discharging groove at a boundary between the outer circumferential surface and the second swarf discharging groove is more than 90°.

7 Claims, 13 Drawing Sheets

(58) Field of Classification Search
CPC ... B23C 2210/168; B23C 5/006; B23C 5/109; B23C 5/00; B23C 5/02
See application file for complete search history.

(56) References Cited

U.S. PATENT DOCUMENTS

| | | | | |
|---|---|---|---|---|
| 4,790,693 | A * | 12/1988 | Koblesky | B23C 5/109 407/113 |
| 5,586,843 | A * | 12/1996 | Minicozzi | B23C 5/109 407/42 |
| 5,913,644 | A * | 6/1999 | DeRoche | B23C 5/109 407/42 |
| 5,947,649 | A * | 9/1999 | Arai | B23C 5/109 407/34 |
| 6,619,891 | B2 * | 9/2003 | Hansson | B23C 5/006 407/35 |
| 7,708,038 | B1 * | 5/2010 | Stewart | B23C 5/2213 144/230 |
| 10,124,412 | B2 * | 11/2018 | Harif | B23C 5/202 |
| 10,239,133 | B2 * | 3/2019 | Suzuki | B23C 5/10 |
| 10,549,352 | B1 * | 2/2020 | Fang | B23B 27/1622 |
| 2003/0223828 | A1 * | 12/2003 | Craig | B23C 5/207 407/35 |
| 2003/0223829 | A1 * | 12/2003 | Craig | B23C 5/109 407/40 |
| 2005/0084341 | A1 * | 4/2005 | Long, II | B23C 5/109 407/48 |
| 2008/0050185 | A1 | 2/2008 | Strouse et al. | |
| 2010/0133761 | A1 * | 6/2010 | Waggle | B23C 5/109 279/143 |
| 2012/0051851 | A1 | 3/2012 | Saito et al. | |
| 2013/0129431 | A1 * | 5/2013 | Filho | B23C 5/109 407/40 |
| 2015/0273589 | A1 * | 10/2015 | Hoffer | B23Q 11/10 407/11 |
| 2015/0283628 | A1 * | 10/2015 | Gamble | B23C 5/003 407/11 |
| 2017/0197257 | A1 * | 7/2017 | Aso | B23C 5/109 |
| 2018/0050397 | A1 * | 2/2018 | Fraese | B23C 5/2208 |
| 2018/0056407 | A1 * | 3/2018 | Kn | B23C 5/006 |
| 2018/0065196 | A1 * | 3/2018 | Kachler | B23B 27/10 |
| 2018/0071840 | A1 | 3/2018 | Suzuki et al. | |

FOREIGN PATENT DOCUMENTS

| | | | | |
|---|---|---|---|---|
| DE | 102009005634 A1 * | 7/2010 | | B23C 5/04 |
| EP | 298154 A1 * | 1/1989 | | |
| EP | 823301 A1 * | 2/1998 | | |
| EP | 2799173 A1 * | 11/2014 | | B23C 5/04 |
| JP | 60020816 A * | 2/1985 | | |
| JP | S60029416 U | 2/1985 | | |
| JP | S62168210 U | 10/1987 | | |
| JP | H02-3376 Y2 | 1/1990 | | |
| JP | 2005-535461 A | 11/2005 | | |
| JP | 2005535461 A | 11/2005 | | |
| JP | 2011-020235 A | 3/2011 | | |
| JP | 2011020235 A | 3/2011 | | |
| JP | 2011-513074 A | 4/2011 | | |
| JP | 2011513074 A | 4/2011 | | |
| JP | 2014-083629 A | 5/2014 | | |
| JP | 2014083629 A | 5/2014 | | |
| WO | WO-2003/101662 A1 | 12/2003 | | |
| WO | WO-2003101662 A1 | 12/2003 | | |
| WO | WO-2009/105408 A2 | 8/2009 | | |
| WO | WO-2009105408 A2 | 8/2009 | | |
| WO | WO-2010/100953 A1 | 9/2010 | | |
| WO | WO-2010100953 A1 | 9/2010 | | |
| WO | WO-2013/022555 A1 | 2/2013 | | |
| WO | WO-2013022555 A1 | 2/2013 | | |

* cited by examiner

US 11,504,780 B2

CUTTING TOOL

TECHNICAL FIELD

The present disclosure relates to a cutting tool. The present application claims priority to Japanese Patent Application No. 2018-170323 filed on Sep. 12, 2018, the entire contents of which are incorporated herein by reference.

BACKGROUND ART

Japanese National Patent Publication No. 2005-535461 (PTL 1) and Japanese National Patent Publication No. 2011-513074 (PTL 2) each disclose a cutting tool having a plurality of cutting inserts helically mounted to a milling body.

CITATION LIST

Patent Literature

PTL 1: Japanese National Patent Publication No. 2005-535461

PTL 2: Japanese National Patent Publication No. 2011-513074

SUMMARY OF INVENTION

A cutting tool according to the present disclosure is a cutting tool rotatable about an axis, and includes a body, a first cutting insert, a second cutting insert, and a third cutting insert. The body has a front end surface, and an outer circumferential surface continuing to the front end surface and provided with a first pocket, a second pocket and a third pocket. The first cutting insert is attached to the first pocket. The second cutting insert is attached to the second pocket. The third cutting insert is attached to the third pocket. The first pocket has a first seat surface located rearward in a rotational direction relative to the first cutting insert, a second seat surface located rearward in an axial direction relative to the first cutting insert, a third seat surface continuing to each of the front end surface, the first seat surface and the second seat surface, and a first swarf discharging groove located forward in the rotational direction relative to the first cutting insert. The second pocket has a fourth seat surface located rearward in the rotational direction relative to each of the second cutting insert and the first seat surface, a fifth seat surface located forward in the axial direction relative to each of the second cutting insert and the second seat surface, a sixth seat surface continuing to each of the fourth seat surface and the fifth seat surface, and a second swarf discharging groove located forward in the rotational direction relative to the second cutting insert and spaced from the first swarf discharging groove. The third pocket has a seventh seat surface located rearward in the rotational direction relative to each of the third cutting insert and the fourth seat surface, an eighth seat surface located forward in the axial direction relative to the third cutting insert and located rearward in the axial direction relative to the fifth seat surface, a ninth seat surface continuing to each of the seventh seat surface and the eighth seat surface, and a third swarf discharging groove located forward in the rotational direction relative to the third cutting insert and in communication with the second swarf discharging groove. In a cross section perpendicular to the axis, an angle formed between a straight line along the sixth seat surface and a tangent of the second swarf discharging groove at a boundary between the outer circumferential surface and the second swarf discharging groove is more than 90°.

DETAILED DESCRIPTION

Figure 1:
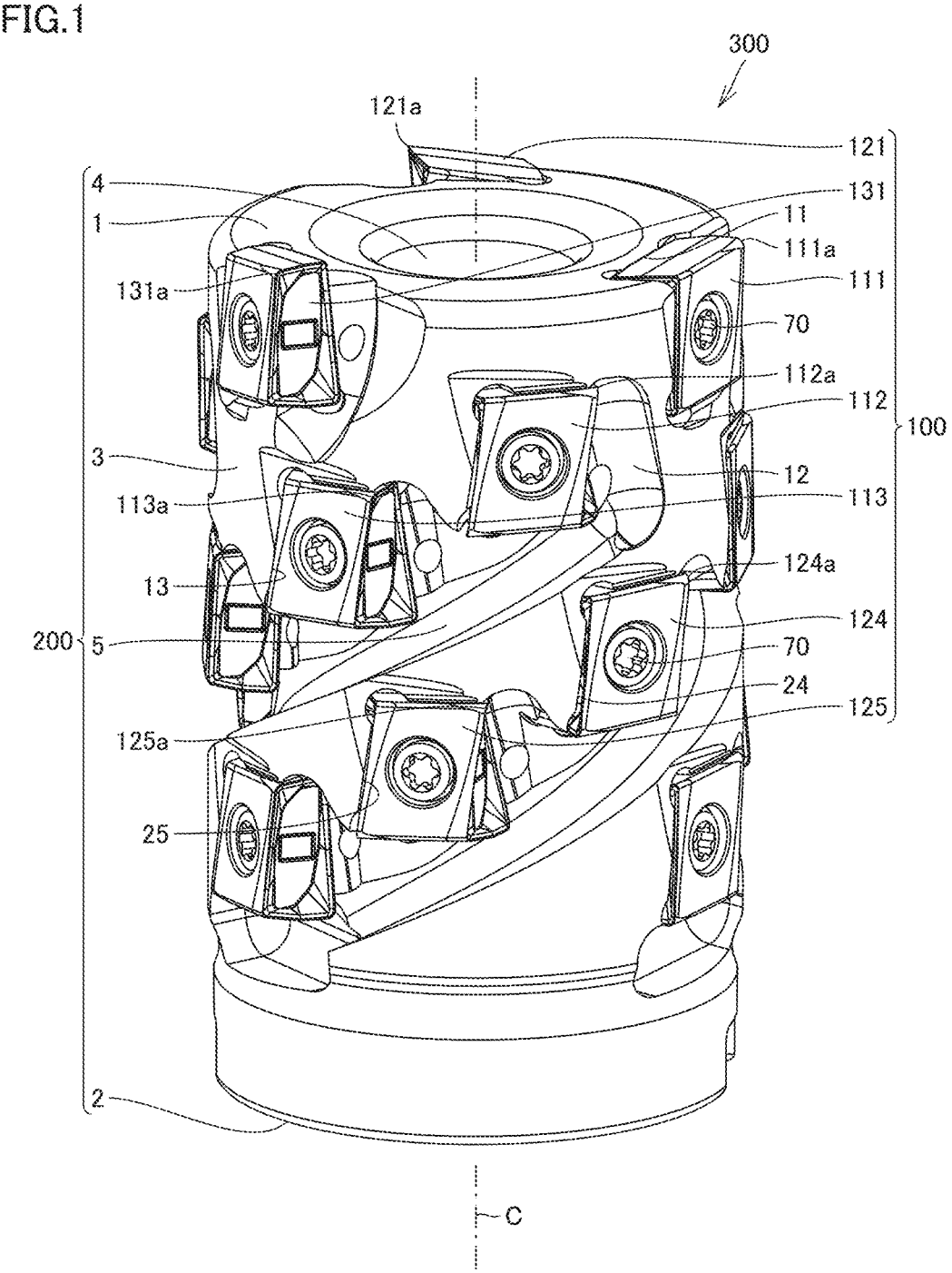
FIG. 1 is a schematic perspective view showing the structure of a cutting tool according to the present embodiment.

Problem to be Solved by the Present Disclosure

When cutting is performed using Japanese National Patent Publication No. 2005-535461 (PTL 1) and Japanese National Patent Publication No. 2011-513074 (PTL 2), however, swarf may clog a groove.

An object of the present disclosure is to provide a cutting tool capable of improving swarf discharging performance.

Advantageous Effect of the Present Disclosure

According to the present disclosure, a cutting tool capable of improving swarf discharging performance can be provided.

Overview of Embodiment of the Present Disclosure

First, an overview of an embodiment of the present disclosure is provided.

(1) A cutting tool 300 according to the present disclosure is cutting tool 300 rotatable about an axis C, and includes a body 200, a first cutting insert 111, a second cutting insert 112, and a third cutting insert 113. Body 200 has a front end surface 1, and an outer circumferential surface 3 continuing to front end surface 1 and provided with a first pocket 11, a second pocket 12 and a third pocket 13. First cutting insert 111 is attached to first pocket 11. Second cutting insert 112 is attached to second pocket 12. Third cutting insert 113 is attached to third pocket 13. First pocket 11 has a first seat surface 11a located rearward in a rotational direction relative to first cutting insert 111, a second seat surface 11c located rearward in an axial direction relative to first cutting insert 111, a third seat surface 11b continuing to each of front end surface 1, first seat surface 11a and second seat surface 11c, and a first swarf discharging groove 11d located forward in the rotational direction relative to first cutting insert 111. Second pocket 12 has a fourth seat surface 12a located rearward in the rotational direction relative to each of second cutting insert 112 and first seat surface 11a, a fifth seat surface 12c located forward in the axial direction relative to each of second cutting insert 112 and second seat surface 11c, a sixth seat surface 12b continuing to each of fourth seat surface 12a and fifth seat surface 12c, and a second swarf discharging groove 12d located forward in the rotational direction relative to second cutting insert 112 and spaced from first swarf discharging groove 11d. Third pocket 13 has a seventh seat surface 13a located rearward in the rotational direction relative to each of third cutting insert 113 and fourth seat surface 12a, an eighth seat surface 13c located forward in the axial direction relative to third cutting insert 113 and located rearward in the axial direction relative to fifth seat surface 12c, a ninth seat surface 13b continuing to each of seventh seat surface 13a and eighth seat surface 13c, and a third swarf discharging groove 13d located forward in the rotational direction relative to third cutting insert 113 and in communication with second swarf discharging groove 12d. In a cross section perpendicular to axis C, an angle formed between a straight line along sixth seat surface 12b and a tangent of second swarf discharging groove 12d at a boundary between outer circumferential surface 3 and second swarf discharging groove 12d is more than 90°.

Swarf of a workpiece cut by second cutting insert 112 temporarily enters second swarf discharging groove 12d, then moves along a wall surface forming second swarf discharging groove 12d, and is ultimately discharged from second swarf discharging groove 12d. If the angle formed between outer circumferential surface 3 of body 200 and the tangent of second swarf discharging groove 12d is small, the swarf is less likely to be discharged from second swarf discharging groove 12d, resulting in the swarf clogging second swarf discharging groove 12d. According to cutting tool 300 of (1) above, in the cross section perpendicular to axis C, the angle formed between the straight line along sixth seat surface 12b and the tangent of second swarf discharging groove 12d at the boundary between outer circumferential surface 3 and second swarf discharging groove 12d is more than 90°. This can allow the swarf of the workpiece cut by second cutting insert 112 to be discharged smoothly from second swarf discharging groove 12d, to suppress the clogging of second swarf discharging groove 12d. As a result, the swarf discharging performance can be improved.

(2) In cutting tool 300 according to (1) above, first cutting insert 111 has a first cutting edge 111a. Second cutting insert 112 has a second cutting edge 112a. Third cutting insert 113 has a third cutting edge 113a. As seen in a direction along axis C, an angle formed between first cutting edge 111a and second cutting edge 112a may be equal to an angle formed between second cutting edge 112a and third cutting edge 113a.

The arrangement of the cutting edges includes equally divided arrangement with an equal interval between the cutting edges and unequally divided arrangement with varying intervals between the cutting edges as seen in the axial direction. In the case of the unequally divided arrangement, a load increases at a portion where the cutting edges overlap each other in the rotational direction, to increase cutting resistance. In addition, cutting tool 300 vibrates during machining, resulting in reduced accuracy of a work surface of the workpiece. In cutting tool 300 according to (2) above, as seen in the direction along axis C, the angle formed between first cutting edge 111a and second cutting edge 112a is equal to the angle formed between second cutting edge 112a and third cutting edge 113a. In short, the arrangement of the cutting edges is the equally divided arrangement. In the case of the equally divided arrangement, the cutting edges overlap to a smaller extent in the rotational direction than in the case of the unequally divided arrangement. As a result, the load on the cutting edges decreases, so that the cutting resistance can be reduced. In addition, by suppressing the vibration of cutting tool 300 during machining, the reduction in the accuracy of the work surface of the workpiece can be suppressed.

(3) In cutting tool 300 according to (2) above, as seen in the direction along axis C, the angle formed between first cutting edge 111a and second cutting edge 112a may be more than or equal to 15° and less than or equal to 180°.

(4) In cutting tool 300 according to (2) or (3) above, as seen in the cross section perpendicular to axis C, in a direction parallel to sixth seat surface 12b, a distance between a boundary between sixth seat surface 12b and second swarf discharging groove 12d, and a boundary between outer circumferential surface 3 and second swarf discharging groove 12d may be more than or equal to 5 mm. The swarf discharging performance can thereby be further improved.

(5) In cutting tool 300 according to any one of (2) to (4) above, outer circumferential surface 3 may be provided with a fourth pocket 24, the fourth pocket being spaced from each of first pocket 11, second pocket 12 and third pocket 13, located rearward in the axial direction relative to each of first pocket 11 and second pocket 12, located rearward in the rotational direction relative to first pocket 11, and located forward in the rotational direction relative to second pocket 12. The cutting tool may further include a fourth cutting insert 124 attached to fourth pocket 24 and having a fourth cutting edge 124a. As seen in the direction along axis C, an angle formed between first cutting edge 111a and fourth cutting edge 124a may be more than or equal to 5° and less than or equal to 90°.

(6) According to cutting tool 300 of any one of (2) to (5) above, in a direction parallel to axis C, first cutting edge 111a may overlap second cutting edge 112a, and second cutting edge 112a may overlap third cutting edge 113a. An amount of overlap between first cutting edge 111a and second cutting edge 112a may be equal to an amount of overlap between second cutting edge 112a and third cutting edge 113a.

(7) According to cutting tool 300 of any one of (1) to (6) above, in the cross section perpendicular to axis C, second swarf discharging groove 12d may include an arc-shaped portion 7. The swarf is discharged from second swarf discharging groove 12d along arc-shaped portion 7. Thus, the swarf discharging performance can be further improved.

(8) According to cutting tool 300 of any one of (1) to (7) above, as seen in the cross section perpendicular to axis C, in a direction perpendicular to sixth seat surface 12b, a distance between sixth seat surface 12b and a bottom 8 of second swarf discharging groove 12d may be more than or equal to 0.5 mm and less than or equal to 1.0 mm. The swarf discharging performance can thereby be further improved.

Details of Embodiment of the Present Disclosure

Next, the details of the embodiment of the present disclosure are described based on the drawings. It should be noted that the same or corresponding parts are designated by the same reference numbers in the following drawings, and description thereof will not be repeated.

First, the structure of a cutting tool 300 according to the present embodiment is described.

FIG. 1 is a schematic perspective view showing the structure of cutting tool 300 according to the present embodiment. As shown in FIG. 1, cutting tool 300 according to the present embodiment is an end mill, for example, and mainly has a body 200, a plurality of cutting inserts 100, and a plurality of fastening screws 70. Cutting tool 300 is a rotary cutting tool rotatable about an axis C. Body 200 mainly has a front end surface 1, a rear end surface 2, an outer circumferential surface 3, and an inner circumferential surface 4. Rear end surface 2 is a surface attached to a headstock. Rear end surface 2 is located opposite to front end surface 1 in a direction along axis C.

Outer circumferential surface 3 continues to each of front end surface 1 and rear end surface 2. Likewise, inner circumferential surface 4 continues to each of front end surface 1 and rear end surface 2. Each of outer circumferential surface 3 and inner circumferential surface 4 surrounds axis C. Outer circumferential surface 3 surrounds inner circumferential surface 4. Inner circumferential surface 4 is formed by a through hole provided along axis C. Outer circumferential surface 3 is provided with a plurality of pockets 11 to 13. One cutting insert 100 is attached to one pocket. Cutting inserts 100 are attached to the pockets with fastening screws 70. Cutting inserts 100 are helically provided on outer circumferential surface 3.

Figure 2:
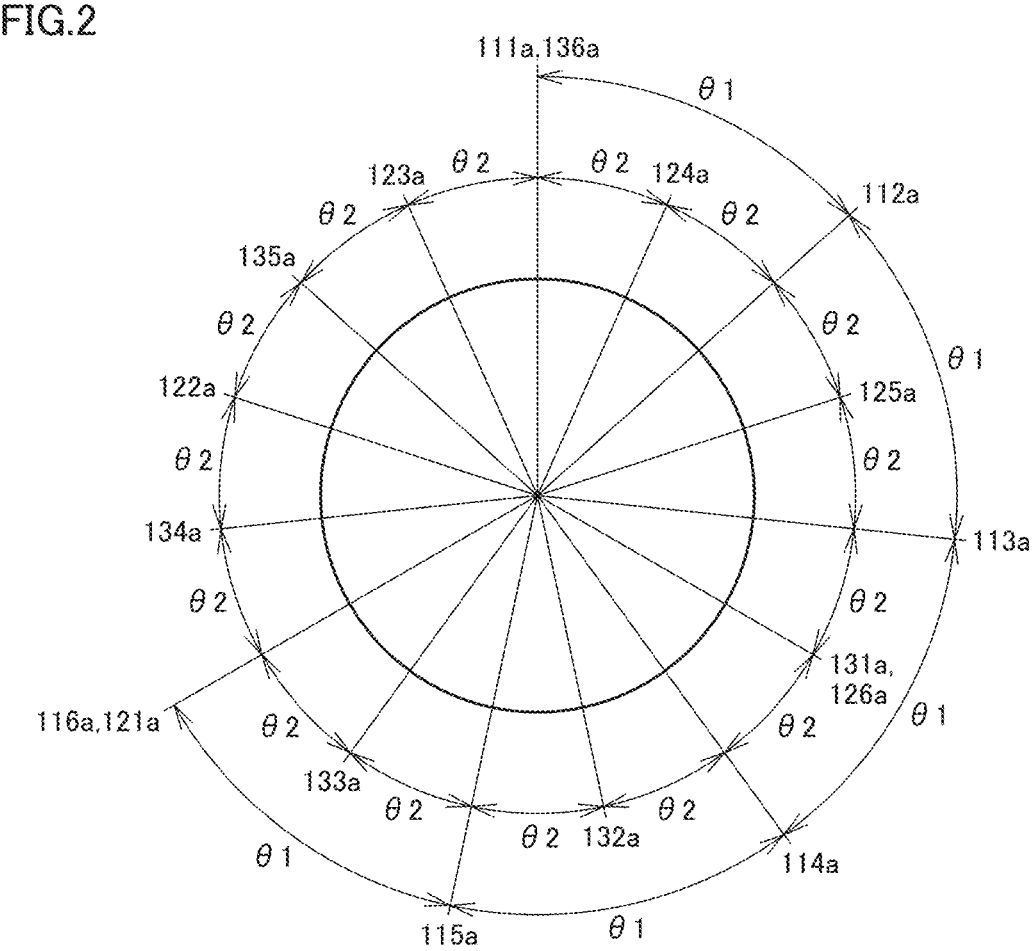
FIG. 2 shows arrangement of cutting edges of the cutting tool according to the present embodiment.

FIG. 2 shows arrangement of cutting edges of cutting tool 300 according to the present embodiment. The number of effective edges is three and the number of rows of cutting inserts is six in cutting tool 300 according to the present embodiment. The total number of edges is the number of effective edges (3)×the number of rows (6)=18. Stated from another perspective, cutting inserts 100 are classified into three groups. Each group includes six cutting inserts. The six cutting inserts included in the respective three groups are arranged along helical curves spaced from one another.

As shown in FIG. 2, as seen from the front end surface side in the direction along axis C, a cutting edge (first cutting edge 111a) of a cutting insert (first cutting insert 111) in a first row of a first group is provided at a position of 0°. A cutting edge (second cutting edge 112a) of a cutting insert (second cutting insert 112) in a second row of the first group is provided at a position of 48°. A cutting edge (third cutting edge 113a) of a cutting insert (third cutting insert 113) in a third row of the first group is provided at a position of 96°. Likewise, cutting edges of cutting inserts in fourth to sixth rows of the first group are provided at positions of 144°, 192° and 240°, respectively.

A cutting edge (sixth cutting edge 121a) of a cutting insert (sixth cutting insert 121) in a first row of a second group is provided at a position of 240°. Cutting edges (122a to 126a) of cutting inserts in second to sixth rows of the second group are provided at positions of 288°, 336°, 24°, 72° and 120°, respectively. A cutting edge (seventh cutting edge 131a) of a cutting insert (seventh cutting insert 131) in a first row of a third group is provided at a position of 120°. Cutting edges (132a to 136a) of cutting inserts in second to sixth rows of the third group are provided at positions of 168°, 216°, 264°, 312° and 0°, respectively.

Line segments extending radially from the center (axis C) of a circle in FIG. 2 are each a line segment connecting axis C to the position of a cutting edge. The position of a cutting edge refers to the most forward position of the cutting edge in the rotational direction.

As shown in FIG. 2, the cutting edges of cutting tool 300 according to the present embodiment are equally divided, for example. In this case, angles formed between every two adjacent cutting edges are equal. Specifically, as seen in the direction along axis C, an angle formed between first cutting edge 111a and second cutting edge 112a is equal to an angle formed between second cutting edge 112a and third cutting edge 113a. An angle formed between two cutting edges refers to an angle formed between a line segment connecting axis C to one cutting edge and a line segment connecting axis C to the other cutting edge. In the present specification, when the difference between the angle formed between first cutting edge 111a and second cutting edge 112a and the angle formed between second cutting edge 112a and third cutting edge 113a is less than or equal to 1°, the angle formed between first cutting edge 111a and second cutting edge 112a is considered equal to the angle formed between second cutting edge 112a and third cutting edge 113a.

As seen in the direction along axis C, the angle (first angle θ1) formed between first cutting edge 111a and second cutting edge 112a is 48°, for example. As seen in the direction along axis C, the angle (first angle θ1) formed between first cutting edge 111a and second cutting edge 112a is more than or equal to 15° and less than or equal to 180°, for example.

While it is preferable that the cutting edges of cutting tool 300 according to the present embodiment be equally divided, they may be unequally divided. That is, as seen in the direction along axis C, the angle formed between first cutting edge 111a and second cutting edge 112a may be different from the angle formed between second cutting edge 112a and third cutting edge 113a.

Figure 3:
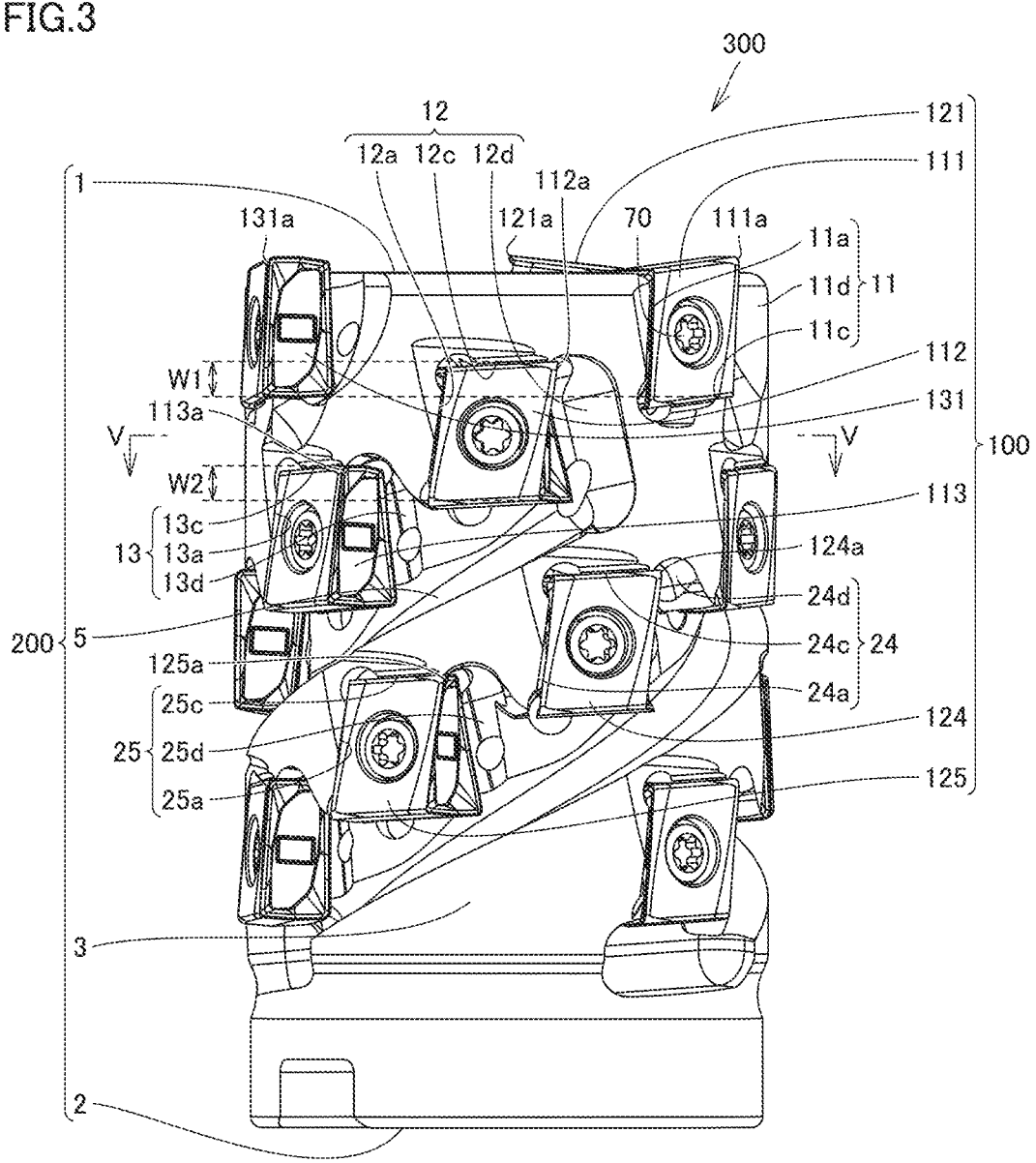
FIG. 3 is a schematic plan view showing the structure of the cutting tool according to the present embodiment.
Figure 4:
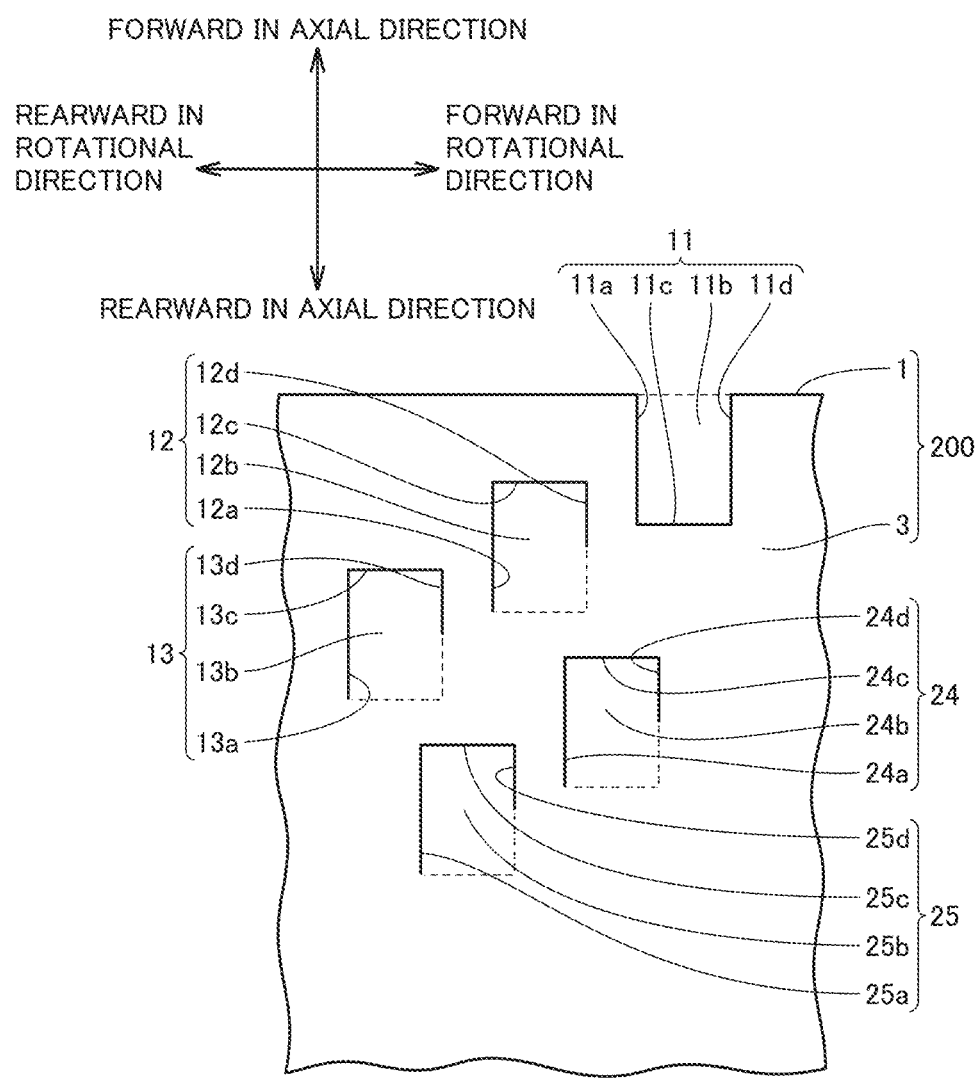
FIG. 4 is a schematic diagram showing pockets provided on an outer circumferential surface of a body, with an axial direction represented on the vertical axis and a rotational direction represented on the horizontal axis.

FIG. 3 is a schematic plan view showing the structure of cutting tool 300 according to the present embodiment. FIG. 4 is a schematic diagram showing the pockets provided on outer circumferential surface 3 of body 200, with the axial direction represented as the vertical direction and the rotational direction represented as the horizontal direction. In FIG. 4, "forward in axial direction" refers to a direction from rear end surface 2 toward front end surface 1. "Rearward in axial direction" refers to a direction from front end surface 1 toward rear end surface 2. "Forward in rotational direction" refers to a direction in which cutting tool 300 rotates. "Rearward in rotational direction" refers to a direction opposite to the direction in which cutting tool 300 rotates.

As shown in FIGS. 3 and 4, outer circumferential surface 3 is provided with first pocket 11, second pocket 12 and third pocket 13. As shown in FIG. 3, first cutting insert 111 is attached to first pocket 11. Second cutting insert 112 is attached to second pocket 12. Third cutting insert 113 is attached to third pocket 13.

As shown in FIGS. 3 and 4, first pocket 11 has a first seat surface 11a, a second seat surface 11c, a third seat surface 11b, and a first swarf discharging groove 11d. First seat surface 11a is located rearward in the rotational direction relative to first cutting insert 111. First seat surface 11a continues to front end surface 1. Second seat surface 11c is located rearward in the axial direction relative to first cutting insert 111. Third seat surface 11b continues to each of front end surface 1, first seat surface 11a and second seat surface 11c. Third seat surface 11b extends rearward in the axial direction from front end surface 1, extends forward in the rotational direction from first seat surface 11a, and extends forward in the axial direction from second seat surface 11c. Third seat surface 11b is located between axis C and outer circumferential surface 3 in a radial direction. First swarf discharging groove 11d is located forward in the rotational direction relative to first cutting insert 111. First swarf discharging groove 11d continues to each of front end surface 1, third seat surface 11b and second seat surface 11c.

As shown in FIGS. 3 and 4, second pocket 12 has a fourth seat surface 12a, a fifth seat surface 12c, a sixth seat surface 12b, and a second swarf discharging groove 12d. Fourth seat surface 12a is located rearward in the rotational direction relative to each of second cutting insert 112 and first seat surface 11a. Fifth seat surface 12c is located forward in the axial direction relative to each of second cutting insert 112 and second seat surface 11c. Fifth seat surface 12c is located between front end surface 1 and second seat surface 11c in the axial direction.

Sixth seat surface 12b continues to each of fourth seat surface 12a and fifth seat surface 12c. Sixth seat surface 12b extends rearward in the axial direction from fifth seat surface 12c, and extends forward in the rotational direction from fourth seat surface 12a. Sixth seat surface 12b is located between axis C and outer circumferential surface 3 in the radial direction. Second swarf discharging groove 12d is located forward in the rotational direction relative to second cutting insert 112. Second swarf discharging groove 12d is spaced from first swarf discharging groove 11d.

As shown in FIGS. 3 and 4, third pocket 13 has a seventh seat surface 13a, an eighth seat surface 13c, a ninth seat surface 13b, and a third swarf discharging groove 13d. Seventh seat surface 13a is located rearward in the rotational direction relative to each of third cutting insert 113 and fourth seat surface 12a. Eighth seat surface 13c is located forward in the axial direction relative to third cutting insert 113, and located rearward in the axial direction relative to fifth seat surface 12c. Second seat surface 11c is located between fifth seat surface 12c and eighth seat surface 13c in the axial direction.

Ninth seat surface 13b continues to each of seventh seat surface 13a and eighth seat surface 13c. Ninth seat surface 13b extends rearward in the axial direction from eighth seat surface 13c, and extends forward in the rotational direction from seventh seat surface 13a. Ninth seat surface 13b is located between axis C and outer circumferential surface 3 in the radial direction. Third swarf discharging groove 13d is located forward in the rotational direction relative to third cutting insert 113. Third swarf discharging groove 13d is in communication with second swarf discharging groove 12d.

As shown in FIG. 3, outer circumferential surface 3 is provided with a communicating groove 5. Communicating groove 5 connects third swarf discharging groove 13d and second swarf discharging groove 12d to each other. Communicating groove 5 helically extends from second swarf discharging groove 12d toward third swarf discharging groove 13d. Communicating groove 5 is located rearward in the axial direction relative to second cutting insert 112. Communicating groove 5 may continue to each of fourth seat surface 12a, sixth seat surface 12b and ninth seat surface 13b.

As shown in FIG. 3, the cutting edges of two adjacent cutting inserts belonging to the same group overlap each other in a direction parallel to axis C. Specifically, in the direction parallel to axis C, first cutting edge 111a overlaps second cutting edge 112a. Second cutting edge 112a overlaps third cutting edge 113a. An amount of overlap W1 between first cutting edge 111a and second cutting edge 112a may be equal to an amount of overlap W2 between second cutting edge 112a and third cutting edge 113a. Amount of overlap W1 between first cutting edge 111a and second cutting edge 112a is more than or equal to 0.8 mm and less than or equal to 2.4 mm, for example. In the present specification, when the difference between amount of overlap W1 and amount of overlap W2 is less than or equal to 0.1 mm, amount of overlap W1 is considered equal to amount of overlap W2.

As shown in FIGS. 3 and 4, outer circumferential surface 3 is provided with a fourth pocket 24 and a fifth pocket 25. A fourth cutting insert 124 is attached to fourth pocket 24. A fifth cutting insert 125 is attached to fifth pocket 25. Fourth pocket 24 and fifth pocket 25 belong to a group different from the group to which each of first pocket 11, second pocket 12 and third pocket 13 belongs. Fourth pocket 24 is spaced from each of first pocket 11, second pocket 12 and third pocket 13. Likewise, fifth pocket 25 is spaced from each of first pocket 11, second pocket 12 and third pocket 13.

Fourth pocket 24 is located rearward in the axial direction relative to each of first pocket 11 and second pocket 12. Fourth pocket 24 is located rearward in the rotational direction relative to first pocket 11, and located forward in the rotational direction relative to second pocket 12. Stated from another perspective, fourth pocket 24 is located between first pocket 11 and second pocket 12 in the rotational direction.

As shown in FIGS. 3 and 4, fourth pocket 24 has a tenth seat surface 24a, an eleventh seat surface 24c, a twelfth seat surface 24b, and a fourth swarf discharging groove 24d. Tenth seat surface 24a is located rearward in the rotational direction relative to each of fourth cutting insert 124 and first seat surface 11a. Tenth seat surface 24a is located forward in the rotational direction relative to fourth seat surface 12a. Eleventh seat surface 24c is located forward in the axial direction relative to fourth cutting insert 124, and located rearward in the axial direction relative to each of second seat surface 11c, fifth seat surface 12c and eighth seat surface 13c.

Twelfth seat surface 24b continues to each of tenth seat surface 24a and eleventh seat surface 24c. Twelfth seat surface 24b extends rearward in the axial direction from eleventh seat surface 24c, and extends forward in the rotational direction from tenth seat surface 24a. Twelfth seat surface 24b is located between axis C and outer circumferential surface 3 in the radial direction. Fourth swarf discharging groove 24d is located forward in the rotational direction relative to fourth cutting insert 124. Fourth swarf discharging groove 24d is spaced from each of first swarf discharging groove 11d, second swarf discharging groove 12d and third swarf discharging groove 13d.

Fifth pocket 25 is located rearward in the axial direction relative to each of fourth pocket 24 and third pocket 13. Fifth pocket 25 is located rearward in the rotational direction relative to each of second pocket 12 and fourth pocket 24, and located forward in the rotational direction relative to third pocket 13.

As shown in FIGS. 3 and 4, fifth pocket 25 has a thirteenth seat surface 25a, a fourteenth seat surface 25c, a fifteenth seat surface 25b, and a fifth swarf discharging groove 25d. Thirteenth seat surface 25a is located rearward in the rotational direction relative to each of fifth cutting insert 125 and tenth seat surface 24a. Thirteenth seat surface 25a is located forward in the rotational direction relative to seventh seat surface 13a. Fourteenth seat surface 25c is located forward in the axial direction relative to fifth cutting insert 125, and located rearward in the axial direction relative to each of fifth seat surface 12c, eighth seat surface 13c and eleventh seat surface 24c.

Fifteenth seat surface 25b continues to each of thirteenth seat surface 25a and fourteenth seat surface 25c. Fifteenth seat surface 25b extends rearward in the axial direction from fourteenth seat surface 25c, and extends forward in the rotational direction from thirteenth seat surface 25a. Fifteenth seat surface 25b is located between axis C and outer circumferential surface 3 in the radial direction. Fifth swarf discharging groove 25d is located forward in the rotational direction relative to fifth cutting insert 125. Fifth swarf discharging groove 25d is spaced from each of first swarf discharging groove 11d, second swarf discharging groove 12d and third swarf discharging groove 13d. Fifth swarf discharging groove 25d is in communication with fourth swarf discharging groove 24d.

Fourth cutting insert 124 has a fourth cutting edge 124a. Fifth cutting insert 125 has a fifth cutting edge 125a. Fourth cutting insert 124 is arranged in a fourth row of the second group. Fifth cutting insert 125 is arranged in a fifth row of the second group. First cutting insert 111 is arranged in the first row of the first group. Second cutting insert 112 is arranged in the second row of the first group. Third cutting insert 113 is arranged in the third row of the first group.

As shown in FIG. 2, in the rotational direction, fourth cutting insert 124 arranged at a position of the fourth row of the second group (24°) is located next to first cutting insert 111 arranged at a position of the first row of the first group (0°). As seen in the direction along axis C, an angle (second angle $\theta 2$) formed between first cutting edge 111a and fourth cutting edge 124a is 24°, for example. As seen in the direction along axis C, the angle (second angle $\theta 2$) formed between first cutting edge 111a and fourth cutting edge 124a is more than or equal to 5° and less than or equal to 90°, for example.

Figure 5:
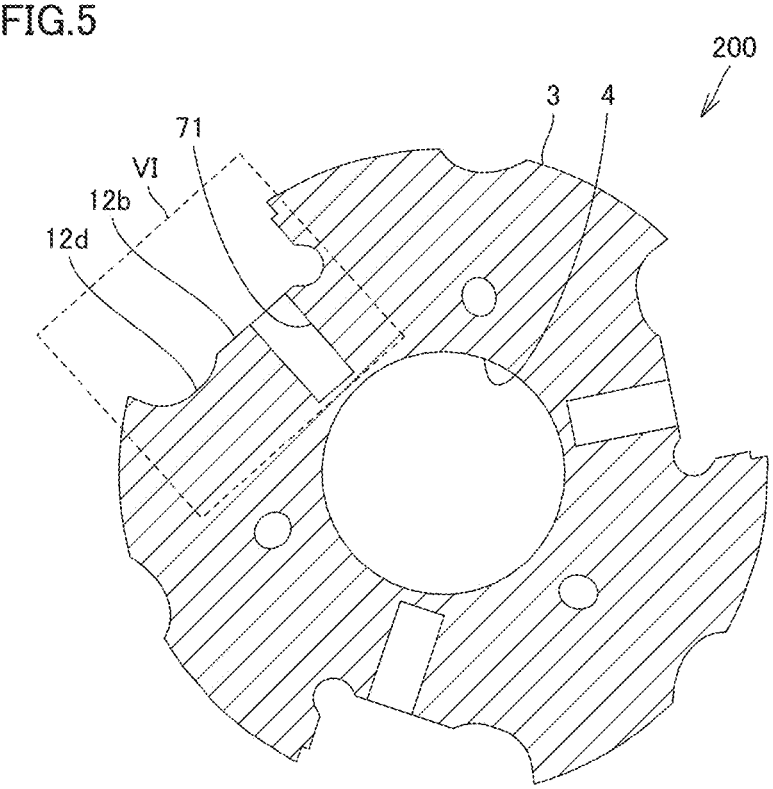
FIG. 5 is a schematic cross-sectional view along the line V-V in FIG. 3.
Figure 6:
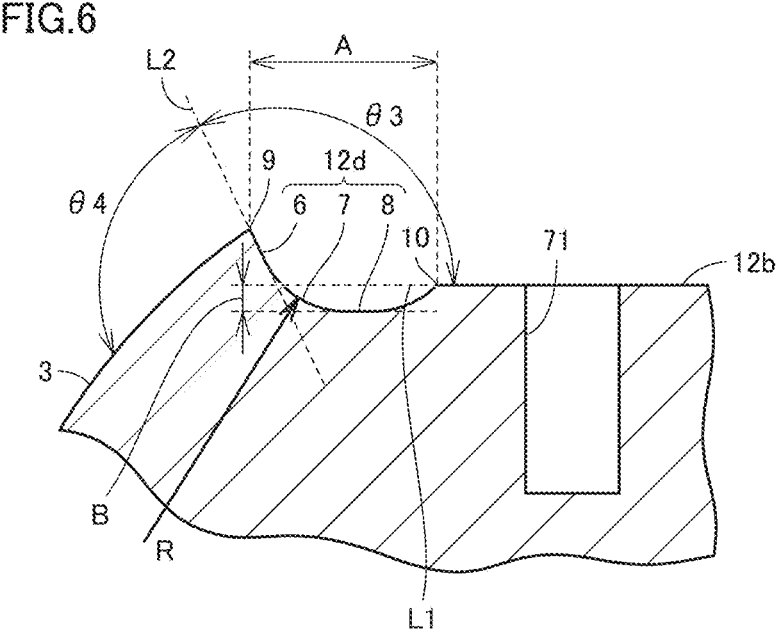
FIG. 6 is a schematic enlarged view of a region VI in FIG. 5.

FIG. 5 is a schematic cross-sectional view along the line V-V in FIG. 3. The cross section along the line V-V is a cross section that is perpendicular to axis C, and that traverses an attachment hole for second cutting insert 112 in the direction parallel to axis C. Only body 200 is shown, and second cutting insert 112 and fastening screw 70 are omitted in FIG. 5. FIG. 6 is a schematic enlarged view of a region VI in FIG. 5.

As shown in FIGS. 5 and 6, sixth seat surface 12b is provided with a screw hole 71. Screw hole 71 extends radially from sixth seat surface 12b toward inner circumferential surface 4. Fastening screw 70 is fastened in screw hole 71.

As shown in FIG. 6, in the cross section perpendicular to axis C, an angle (third angle $\theta 3$) formed between a straight line (first straight line L1) along sixth seat surface 12b and a tangent (second straight line L2) of second swarf discharging groove 12d at a boundary between outer circumferential surface 3 and second swarf discharging groove 12d is more than 90°. Third angle $\theta 3$ may be more than 95°, or more than 100°. Third angle $\theta 3$ may have an upper limit of 270°, for example.

As shown in FIG. 6, in the cross section perpendicular to axis C, second swarf discharging groove 12d may have a linear portion 6 and an arc-shaped portion 7, for example. Linear portion 6 continues to outer circumferential surface 3. Arc-shaped portion 7 continues to each of linear portion 6 and sixth seat surface 12b. Arc-shaped portion 7 is located between linear portion 6 and sixth seat surface 12b. When second swarf discharging groove 12d has the structure shown in FIG. 6, linear portion 6 coincides with second straight line L2. An angle (fourth angle $\theta 4$) formed between second straight line L2 and a tangent of outer circumferential surface 3 may be less than 90°, or more than or equal to 90°, for example.

As shown in FIG. 6, as seen in the cross section perpendicular to axis C, in a direction parallel to sixth seat surface 12b, a distance (first distance A) between a boundary (first boundary 10) between sixth seat surface 12b and second swarf discharging groove 12d, and a boundary (second boundary 9) between outer circumferential surface 3 and second swarf discharging groove 12d is more than or equal to 5 mm, for example. First distance A may be more than or equal to 5.5 mm, or more than or equal to 6 mm, for example.

Arc-shaped portion 7 continues to sixth seat surface 12b at first boundary 10. Linear portion 6 continues to outer circumferential surface 3 at the second boundary. As seen from sixth seat surface 12b, arc-shaped portion 7 is provided at a position lower than sixth seat surface 12b. Stated from another perspective, arc-shaped portion 7 is located between a plane along sixth seat surface 12b and inner circumferential surface 4. As seen from sixth seat surface 12b, linear portion 6 is provided at a position higher than sixth seat surface 12b. Stated from another perspective, linear portion 6 is located between the plane along sixth seat surface 12b and second boundary 9.

As shown in FIG. 6, as seen in the cross section perpendicular to axis C, in a direction perpendicular to sixth seat surface 12b, a distance (second distance B) between sixth seat surface 12b and a bottom 8 of second swarf discharging groove 12d is more than or equal to 0.5 mm and less than or equal to 1.0 mm, for example. Second distance B may be more than or equal to 0.55 mm, or more than or equal to 0.6 mm, for example. Second distance B may be less than or equal to 0.95 mm, or less than or equal to 0.9 mm. Bottom 8 of second swarf discharging groove 12d refers to a position of second swarf discharging groove 12d that is farthest from sixth seat surface 12b in a direction perpendicular to sixth seat surface 12b and toward inner circumferential surface 4 from sixth seat surface 12b.

Figure 7:
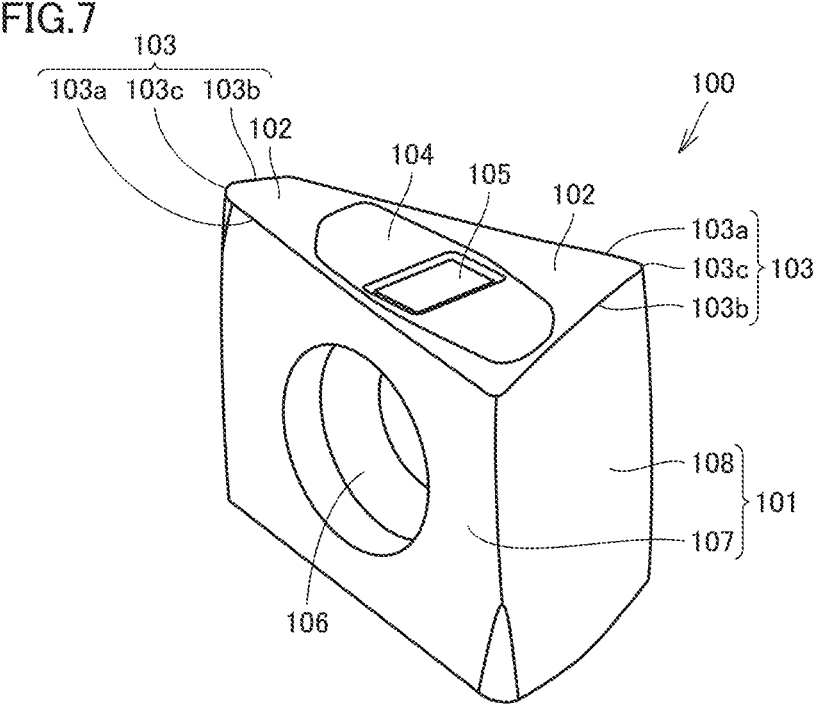
FIG. 7 is a schematic perspective view showing the structure of a cutting insert of the cutting tool according to the present embodiment.
Figure 8:
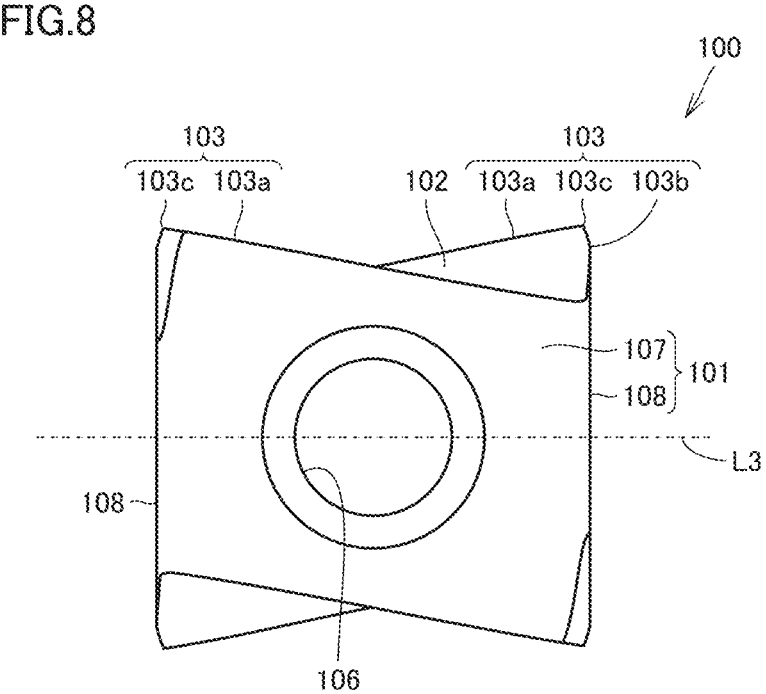
FIG. 8 is a schematic front view showing the structure of the cutting insert of the cutting tool according to the present embodiment.

Next, the structure of the cutting insert is described. FIG. 7 is a schematic perspective view showing the structure of the cutting insert of cutting tool 300 according to the present embodiment. FIG. 8 is a schematic front view showing the structure of the cutting insert of cutting tool 300 according to the present embodiment.

As shown in FIGS. 7 and 8, cutting insert 100 mainly has a rake face 102, a flank face 101, a flat face 104, and an attachment hole 106. A ridgeline of rake face 102 and flank face 101 forms a cutting edge 103. Flank face 101 has a first outer peripheral region 107 and a second outer peripheral region 108. First outer peripheral region 107 is provided with attachment hole 106. Second outer peripheral region 108 is not provided with attachment hole 106. As seen in a direction perpendicular to flat face 104, flat face 104 is surrounded by rake face 102. Flat face 104 may be provided with a recess 105.

Cutting edge 103 has a main cutting edge portion 103a, a sub-cutting edge portion 103b, and a corner cutting edge portion 103c. Main cutting edge portion 103a and sub-cutting edge portion 103b are each linear. Corner cutting edge portion 103c is curved. Main cutting edge portion 103a is longer than sub-cutting edge portion 103b. Corner cutting edge portion 103c is located between main cutting edge portion 103a and sub-cutting edge portion 103b. A ridgeline of each of the pair of first outer peripheral regions 107 and rake face 102 forms main cutting edge portion 103a. A ridgeline of each of the pair of second outer peripheral regions 108 and rake face 102 forms sub-cutting edge portion 103b. When cutting insert 100 is attached to a pocket of body 200, corner cutting edge portion 103c may be located most forward in the rotational direction. Stated from another perspective, cutting insert 100 may be attached to the pocket such that corner cutting edge portion 103c is located forward in the rotational direction relative to each of main cutting edge portion 103a and sub-cutting edge portion 103b.

As shown in FIG. 8, each of the pair of main cutting edge portions 103a may be tilted with respect to a straight line (third straight line L3) perpendicular to second outer peripheral region 108. As shown in FIG. 8, as seen in a direction perpendicular to first outer peripheral region 107, the pair of main cutting edge portions 103a may extend to intersect each other. Stated from another perspective, a direction of tilt of one of main cutting edge portions 103a with respect to the third straight line may be different from a direction of tilt of the other main cutting edge portion 103a with respect to the third straight line.

When cutting insert 100 is attached to first pocket 11 of body 200, flat face 104 is in contact with first seat surface 11a, second outer peripheral region 108 is in contact with second seat surface 11c, and first outer peripheral region 107 is in contact with third seat surface 11b. When cutting insert 100 is attached to second pocket 12 of body 200, flat face 104 is in contact with fourth seat surface 12a, second outer peripheral region 108 is in contact with fifth seat surface 12c, and first outer peripheral region 107 is in contact with sixth seat surface 12b. When cutting insert 100 is attached to third pocket 13 of body 200, flat face 104 is in contact with seventh seat surface 13a, second outer peripheral region 108 is in contact with eighth seat surface 13c, and first outer peripheral region 107 is in contact with ninth seat surface 13b.

Figure 9:
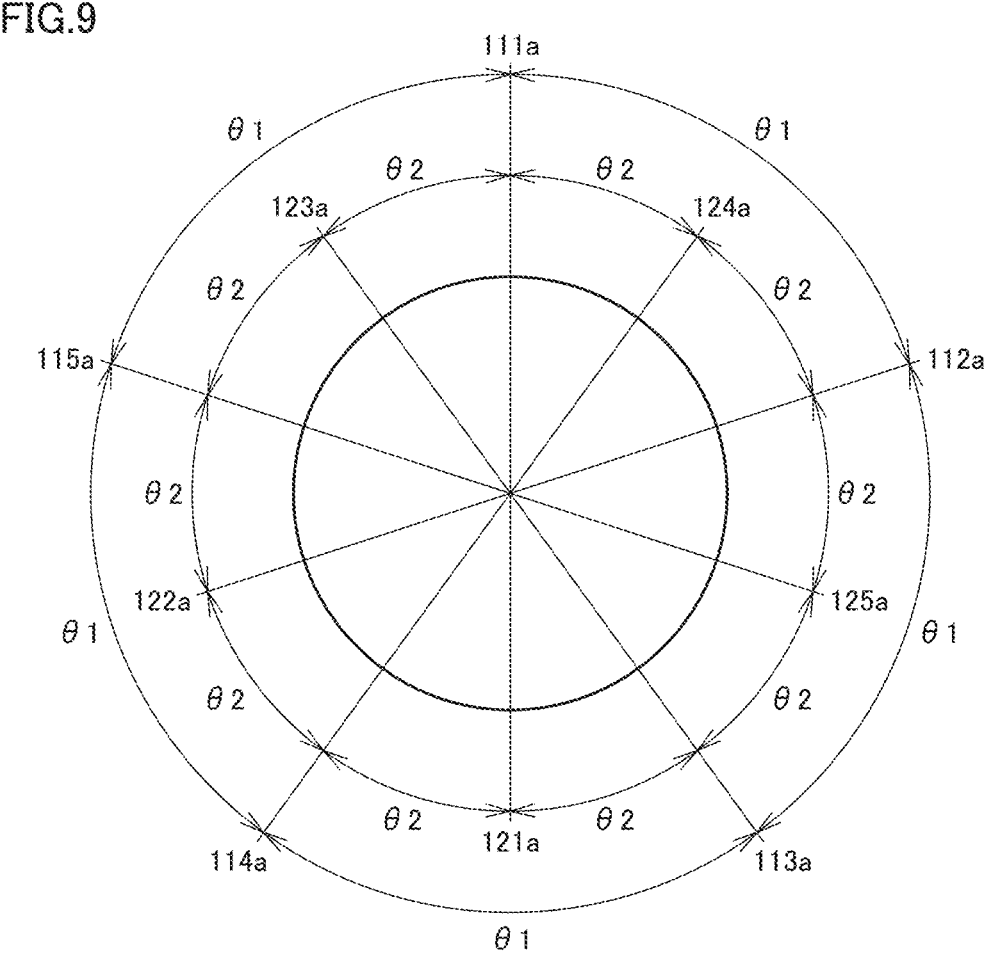
FIG. 9 shows arrangement of cutting edges in a variation of the cutting tool according to the present embodiment.

FIG. 9 shows arrangement of cutting edges in a variation of cutting tool 300 according to the present embodiment. The number of effective edges is two and the number of rows of cutting inserts is five in cutting tool 300. The total number of edges is the number of effective edges (2)×the number of rows (5)=10. Stated from another perspective, the cutting inserts are classified into two groups. Each group includes five cutting inserts. The five cutting inserts included in the respective two groups are arranged along helical curves spaced from each other.

As shown in FIG. 9, as seen in the direction along axis C, the cutting edge (first cutting edge 111a) of the cutting insert (first cutting insert 111) in the first row of the first group is provided at a position of 0°. The cutting edge (second cutting edge 112a) of the cutting insert (second cutting insert 112) in the second row of the first group is provided at a position of 72°. The cutting edge (third cutting edge 113a) of the cutting insert (third cutting insert 113) in the third row of the first group is provided at a position of 144°. Likewise, the cutting edges of the cutting inserts in the fourth and fifth rows of the first group are provided at positions of 216° and 288°, respectively.

The cutting edge of the cutting insert in the first row of the second group is provided at a position of 180°. The cutting edges of the cutting inserts in the second to fifth rows of the second group are provided at positions of 252°, 324°, 36° and 108°, respectively. Line segments extending radially from the center (axis C) in FIG. 9 are each a line segment connecting axis C to the position of a cutting edge. The position of a cutting edge refers to the most forward position of the cutting edge in the rotational direction.

As shown in FIG. 9, the cutting edges of cutting tool 300 according to the present embodiment are arranged by being equally divided, for example. As seen in the direction along axis C, the angle (first angle θ1) formed between first cutting edge 111a and second cutting edge 112a is 72°, for example. As seen in the direction along axis C, the angle (second angle θ2) formed between first cutting edge 111a and fourth cutting edge 124a is 36°, for example.

Next, function and effect of cutting tool 300 according to the present embodiment will be described.

Swarf of a workpiece cut by second cutting insert 112 temporarily enters second swarf discharging groove 12d, then moves along a wall surface forming second swarf discharging groove 12d, and is ultimately discharged from second swarf discharging groove 12d. If the angle formed between outer circumferential surface 3 of body 200 and the tangent of second swarf discharging groove 12d is small, the swarf is less likely to be discharged from second swarf discharging groove 12d, resulting in the swarf clogging second swarf discharging groove 12d. According to cutting tool 300 in the present embodiment, in the cross section perpendicular to axis C, the angle formed between the straight line along sixth seat surface 12b and the tangent of second swarf discharging groove 12d at the boundary between outer circumferential surface 3 and second swarf discharging groove 12d is more than 90°. This can allow the swarf of the workpiece cut by second cutting insert 112 to be discharged smoothly from second swarf discharging groove 12d, to suppress the clogging of second swarf discharging groove 12d. As a result, the swarf discharging performance can be improved.

The arrangement of the cutting edges includes equally divided arrangement with an equal interval between the cutting edges and unequally divided arrangement with varying intervals between the cutting edges as seen in the axial direction. In the case of the unequally divided arrangement, a load increases at a portion where the cutting edges overlap each other in the rotational direction, to increase cutting resistance. In addition, cutting tool 300 vibrates during machining, resulting in reduced accuracy of a work surface of the workpiece. In cutting tool 300 according to the present embodiment, as seen in the direction along axis C, the angle formed between first cutting edge 111a and second cutting edge 112a is equal to the angle formed between second cutting edge 112a and third cutting edge 113a. In short, the arrangement of the cutting edges is the equally divided arrangement. In the case of the equally divided arrangement, the cutting edges overlap to a smaller extent in the rotational direction than in the case of the unequally divided arrangement. As a result, the load on the cutting edges decreases, so that the cutting resistance can be reduced.

In addition, by suppressing the vibration of cutting tool 300 during machining, the reduction in the accuracy of the work surface of the workpiece can be suppressed.

In cutting tool 300 according to the present embodiment, as seen in the cross section perpendicular to axis C, in the direction parallel to sixth seat surface 12b, the distance between the boundary between sixth seat surface 12b and second swarf discharging groove 12d, and the boundary between outer circumferential surface 3 and second swarf discharging groove 12d may be more than or equal to 5 mm. The swarf discharging performance can thereby be further improved.

Further, in cutting tool 300 according to the present embodiment, in the cross section perpendicular to axis C, second swarf discharging groove 12d may include arc-shaped portion 7. The swarf is discharged from second swarf discharging groove 12d along arc-shaped portion 7. Thus, the swarf discharging performance can be further improved.

Further, in cutting tool 300 according to the present embodiment, as seen in the cross section perpendicular to axis C, in the direction perpendicular to sixth seat surface 12b, the distance between sixth seat surface 12b and the bottom of second swarf discharging groove 12d may be more than or equal to 0.5 mm and less than or equal to 1.0 mm. The swarf discharging performance can thereby be further improved.

EXAMPLE (Preparation of Samples)

Figure 10:
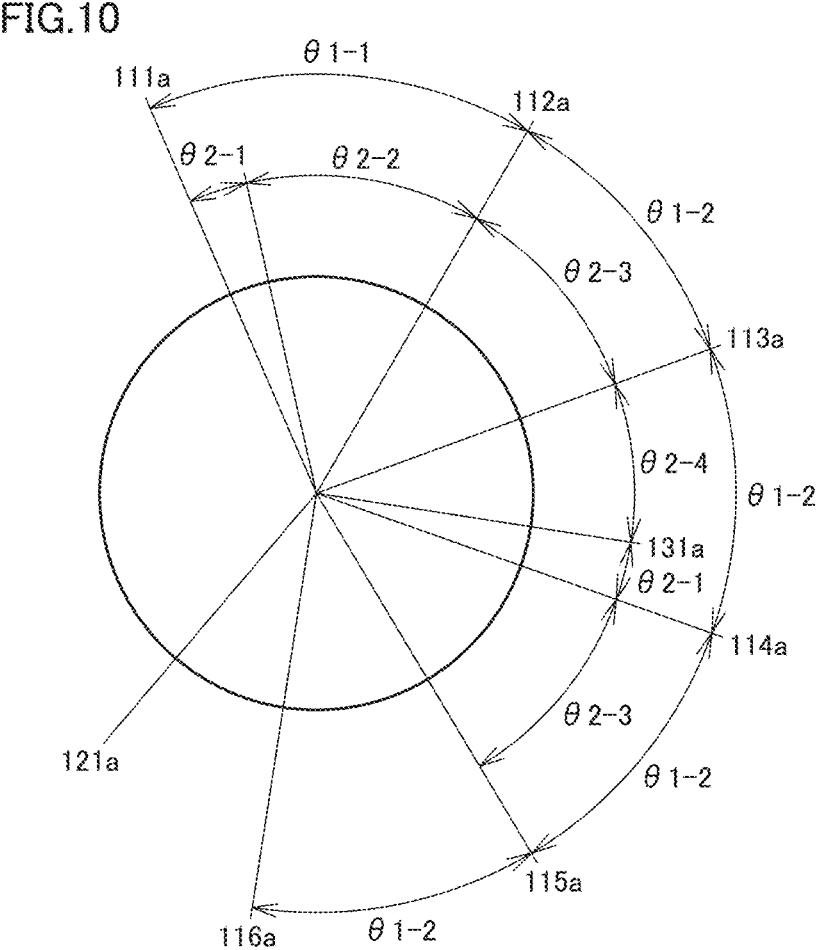
FIG. 10 shows arrangement of cutting edges of a cutting tool according to a sample 2.

First, end mills 300 according to samples 1 to 3 were prepared. Sample 1 was end mill 300 according to the present embodiment (see FIG. 1). Specifically, the arrangement of cutting edges of end mill 300 according to sample 1 was the equally divided arrangement. The number of effective edges was three. The number of rows was six. First angle θ1 (see FIG. 2) was 48°. Second angle θ2 (see FIG. 2) was 24°. Third angle θ3 (see FIG. 6) was 123°. FIG. 10 shows the arrangement of cutting edges of a cutting tool according to sample 2. As shown in FIG. 10, the arrangement of cutting edges of end mill 300 according to sample 2 was the unequally divided arrangement. The number of effective edges was three. The number of rows was six.

Figure 11:
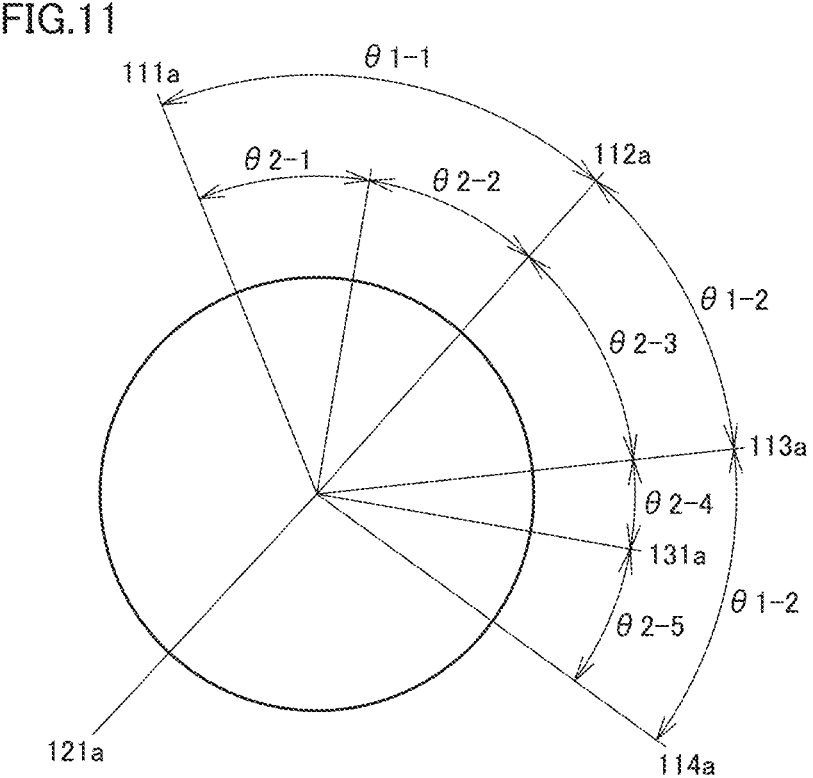
FIG. 11 shows arrangement of cutting edges of a cutting tool according to a sample 3.

The total number of edges was eighteen. An angle θ1-1 was 52°. An angle θ1-2 was 40°. An angle θ2-1 was 10°. An angle θ2-2 was 42°. An angle θ2-3 was 40°. An angle θ2-4 was 30°. FIG. 11 shows the arrangement of cutting edges of a cutting tool according to sample 3. As shown in FIG. 11, the arrangement of cutting edges of end mill 300 according to sample 3 was the unequally divided arrangement. The number of effective edges was three. The number of rows was four. The total number of edges was twelve. Angle θ1-1 was 60°. Angle θ1-2 was 45°. Angle θ2-1 was 35°. Angle θ2-2 was 25°. Angle θ2-3 was 45°. Angle θ2-4 was 15°. An angle θ2-5 was 30°.

(Evaluation Method)

End mills 300 according to samples 1 to 3 were used for end surface and side surface machining. End mills 300 each had a diameter of 50 mm. The equipment was M/C BT-50 vertical type (alloy). The cutting speed (Vc) was 200 m/min. The feed per tooth (fz) was 0.2 mm/tooth. The depth of axial cut (ap) was 45 mm. The depth of radial cut (ae) was 5 mm. Oil was supplied in a dry manner. The direction of cutting was a downcutting direction. The workpiece was S50C.

(Evaluation Result 1: Cutting Resistance)

Figure 12:
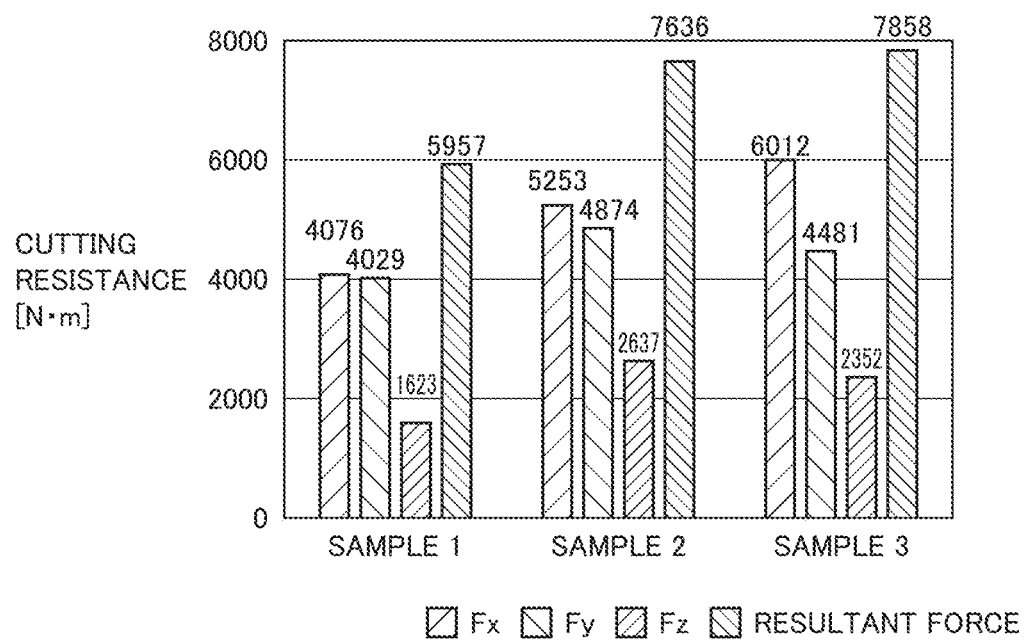
FIG. 12 shows cutting resistance of end mills according to samples 1 to 3.

FIG. 12 shows cutting resistance of end mills 300 according to samples 1 to 3. In FIG. 12, Fx represents a principal cutting force. Fy represents a feed force. Fz represents a thrust force. A resultant force is the square root of the sum of the square of each force. As shown in FIG. 12, it was confirmed that end mill 300 according to sample 1 was smaller in cutting resistance than end mills 300 according to samples 2 and 3 at each of Fx, Fy, Fz and the resultant force.

(Evaluation Result 2: Wall Surface Accuracy)

Figure 13:
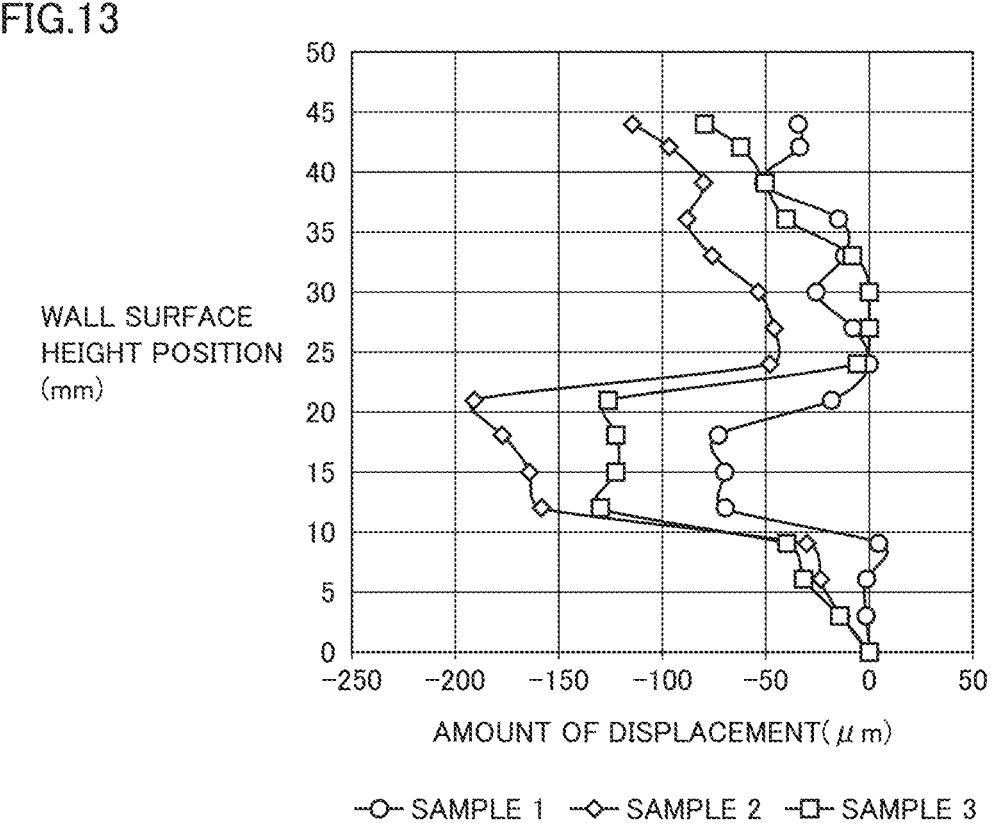
FIG. 13 shows relation between a wall surface height position and an amount of displacement of workpieces machined with the end mills according to samples 1 to 3.

FIG. 13 shows relation between a wall surface height position and an amount of displacement of workpieces machined with end mills 300 according to samples 1 to 3. The vertical axis and the horizontal axis in FIG. 13 represent the wall surface height position and the amount of lateral displacement of the wall surface of the workpieces, respectively. A smaller amount of displacement means a higher accuracy of the wall surface. As shown in FIG. 13, the workpiece machined with end mill 300 according to sample 1 was smaller in the amount of displacement of the wall surface than the workpieces machined with end mills 300 according to samples 2 and 3. That is, it was confirmed that the workpiece machined with end mill 300 according to sample 1 was higher in wall surface accuracy than the workpieces machined with end mills 300 according to samples 2 and 3.

It should be understood that the embodiment and example disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 front end surface; 2 rear end surface; 3 outer circumferential surface; 4 inner circumferential surface; 5 communicating groove; 6 linear portion; 7 arc-shaped portion; 8 bottom; 9 second boundary; 10 first boundary; 11 first pocket; 11a first seat surface; 11b third seat surface; 11c second seat surface; 11d first swarf discharging groove; 12 second pocket; 12a fourth seat surface; 12b sixth seat surface; 12c fifth seat surface; 12d second swarf discharging groove; 13 third pocket; 13a seventh seat surface; 13b ninth seat surface; 13c eighth seat surface; 13d third swarf discharging groove; 24 fourth pocket; 24a tenth seat surface; 24b twelfth seat surface; 24c eleventh seat surface; 24d fourth swarf discharging groove; 25 fifth pocket; 25a thirteenth seat surface; 25b fifteenth seat surface; 25c fourteenth seat surface; 25d fifth swarf discharging groove; 70 fastening screw; 71 screw hole; 100 cutting insert; 101 flank face; 102 rake face; 103 cutting edge; 103a main cutting edge portion; 103b sub-cutting edge portion; 103c corner cutting edge portion; 104 flat face; 105 recess; 106 attachment hole; 107 first outer peripheral region; 108 second outer peripheral region; 111 first cutting insert; 111a first cutting edge; 112 second cutting insert; 112a second cutting edge; 113 third cutting insert; 113a third cutting edge; 124 fourth cutting insert; 124a fourth cutting edge; 125 fifth cutting insert; 125a fifth cutting edge; 121 sixth cutting insert; 121a sixth cutting edge; 131 seventh cutting insert; 131a seventh cutting edge; 200 body; 300 cutting tool (end mill); A first distance; B second distance; C axis; L1 first straight line; L2 second straight line; L3 third straight line; W1, W2 amount of overlap; θ1 first angle; θ2 second angle; θ3 third angle; θ4 fourth angle.

The invention claimed is:

1. A cutting tool rotatable about an axis, the cutting tool comprising:
a body having a front end surface, and an outer circumferential surface continuing to the front end surface and provided with a first pocket, a second pocket and a third pocket;
a first cutting insert attached to the first pocket;
a second cutting insert attached to the second pocket; and
a third cutting insert attached to the third pocket, wherein
the first pocket having a first seat surface located rearward in a rotational direction relative to the first cutting insert, a second seat surface located rearward in an axial direction relative to the first cutting insert, a third seat surface continuing to each of the front end surface, the first seat surface and the second seat surface, and a first swarf discharging groove located forward in the rotational direction relative to the first cutting insert,
the second pocket having a fourth seat surface located rearward in the rotational direction relative to each of the second cutting insert and the first seat surface, a fifth seat surface located forward in the axial direction relative to each of the second cutting insert and the second seat surface, a sixth seat surface continuing to each of the fourth seat surface and the fifth seat surface, and a second swarf discharging groove located forward in the rotational direction relative to the second cutting insert and spaced from and not in communication with the first swarf discharging groove, the third pocket having a seventh seat surface located rearward in the rotational direction relative to each of the third cutting insert and the fourth seat surface, an eighth seat surface located forward in the axial direction relative to the third cutting insert and located rearward in the axial direction relative to the fifth seat surface, a ninth seat surface continuing to each of the seventh seat surface and the eighth seat surface, and a third swarf discharging groove located forward in the rotational direction relative to the third cutting insert and in communication with the second swarf discharging groove, in a cross section perpendicular to the axis, an angle formed between a straight line along the sixth seat surface and a tangent of the second swarf discharging groove at a boundary between the outer circumferential surface and the second swarf discharging groove being more than 90°, the second cutting insert having a first surface and a second surface that is opposite to the first surface, the first surface in contact with the fifth seat surface, the second surface is separated from the body, and an entirety of the second surface of the second cutting insert is not in direct contact with the body, a part of the second cutting insert overlaps the third cutting insert in the rotational direction, the outer circumferential surface is provided with a fourth pocket, the fourth pocket being spaced from each of the first pocket, the second pocket and the third pocket, located rearward in the axial direction relative to each of the first pocket and the second pocket, located rearward in the rotational direction relative to the first pocket, and located forward in the rotational direction relative to the second pocket, the cutting tool further comprises a fourth cutting insert attached to the fourth pocket and having a fourth cutting edge, the fourth pocket has a fourth swarf discharging groove, the fourth swarf discharging groove is located forward in the rotational direction relative to the fourth cutting insert, and the fourth swarf discharging groove is spaced from and not in communication with the first swarf discharging groove, the fourth pocket has a tenth seat surface and an eleventh seat surface, the eleventh seat surface of the fourth pocket is located forward in the axial direction relative to the fourth cutting insert and located rearward in the axial direction relative to the eighth seat surface of the third pocket, the cutting tool has an inner circumferential surface extending along the axis and surrounded by the outer circumferential surface, the sixth seat surface is provided with a screw hole, the screw hole extends from sixth seat surface toward the inner circumferential surface, the screw hole extends in a radial direction, the inner circumferential surface completely surrounds the axis, the first cutting insert has a first cutting edge, the second cutting insert has a second cutting edge, the third cutting insert has a third cutting edge, and as seen in a direction along the axis, an angle formed between the first cutting edge and the second cutting edge is equal to an angle formed between the second cutting edge and the third cutting edge.

2. The cutting tool according to claim 1, wherein as seen in the direction along the axis, the angle formed between the first cutting edge and the second cutting edge is more than or equal to 15° and less than or equal to 180°.

3. The cutting tool according to claim 1, wherein as seen in the cross section perpendicular to the axis, in a direction parallel to the sixth seat surface, a distance between a boundary between the sixth seat surface and the second swarf discharging groove, and the boundary between the outer circumferential surface and the second swarf discharging groove is more than or equal to 5 mm.

4. The cutting tool according to claim 1, wherein as seen in the direction along the axis, an angle formed between the first cutting edge and the fourth cutting edge is more than or equal to 5° and less than or equal to 90°.

5. The cutting tool according to claim 1, wherein in a direction parallel to the axis, the first cutting edge overlaps the second cutting edge, and the second cutting edge overlaps the third cutting edge, and an amount of overlap between the first cutting edge and the second cutting edge is equal to an amount of overlap between the second cutting edge and the third cutting edge.

6. The cutting tool according to claim 1, wherein in the cross section perpendicular to the axis, the second swarf discharging groove includes an arc-shaped portion.

7. The cutting tool according to claim 1, wherein as seen in the cross section perpendicular to the axis, in a direction perpendicular to the sixth seat surface, a distance between the sixth seat surface and a bottom of the second swarf discharging groove is more than or equal to 0.5 mm and less than or equal to 1.0 mm.

* * * * *